Jan. 23, 1951     D. T. GUNDERSEN ET AL     2,539,131
EDGE POSITION DETECTOR
Filed Nov. 24, 1948     2 Sheets-Sheet 1
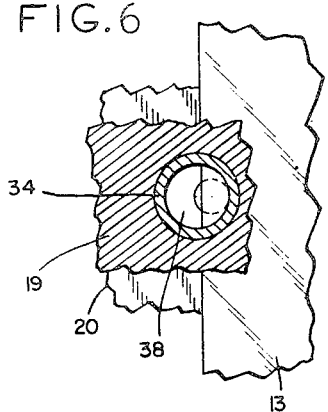
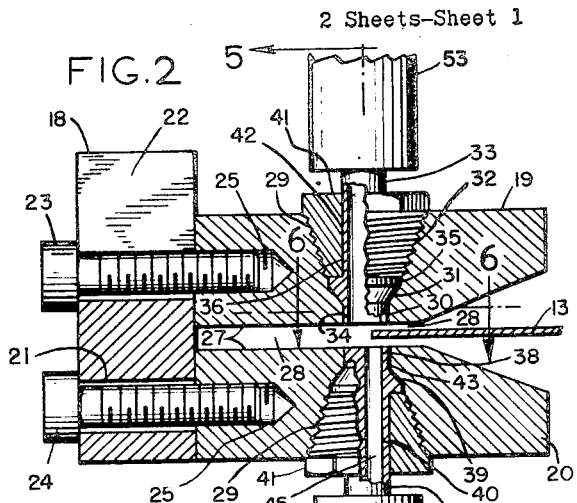
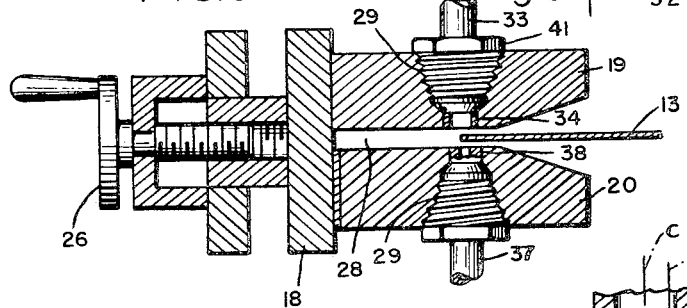
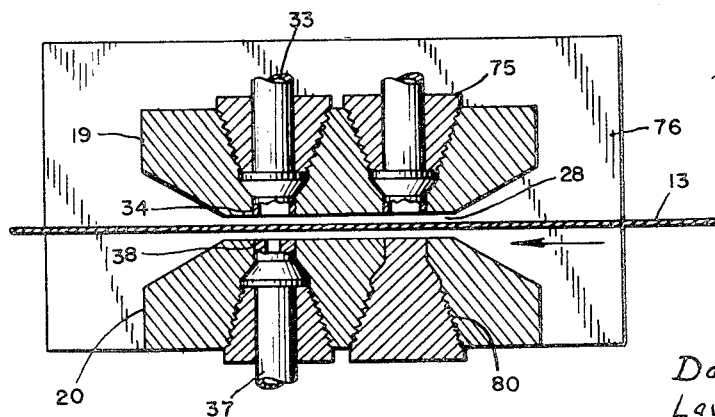
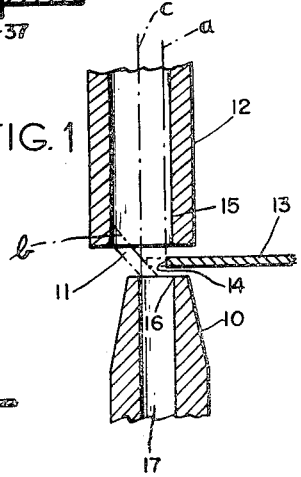
Daniel T. Gundersen
Lawrence A. Weinecke
INVENTORS
BY
ATTORNEYS

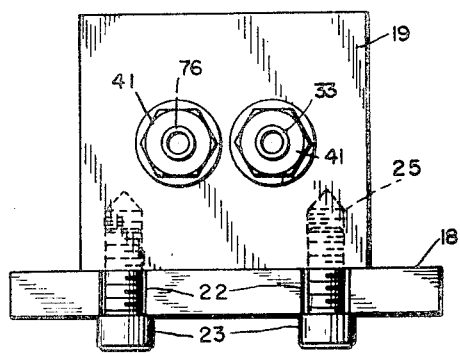
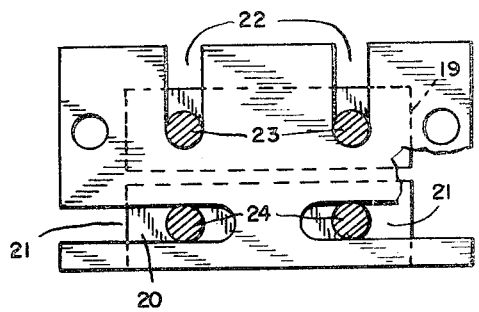
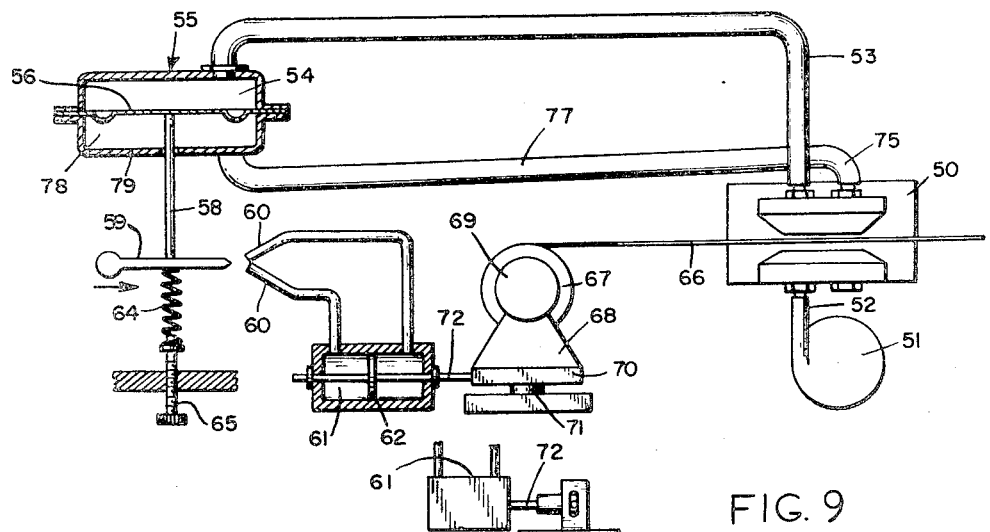
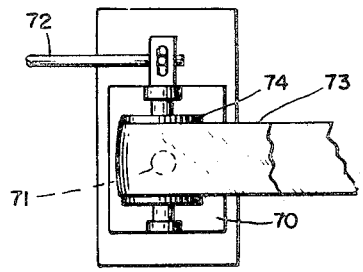

Patented Jan. 23, 1951

2,539,131

UNITED STATES PATENT OFFICE 2,539,131

EDGE POSITION DETECTOR

Daniel T. Gundersen, Chicago, and Lawrence A. Weinecke, Wilmette, Ill., assignors to Askania Regulator Company, Chicago, Ill., a corporation of Illinois Application November 24, 1948, Serial No. 61,834

17 Claims. (Cl. 121—41)

1

This invention relates to signal generating apparatus of the kind including a pressure responsive expansible chamber signal generator, and a detector having a receiver aperture connected with the generator and a nozzle for directing toward the receiver aperture a stream of fluid which is intercepted to a greater or less extent by the marginal portion of a body extending into the stream from beyond one of its sides, and so movable that the position of its edge changes in directions parallel to the direction in which the body extends into the stream.

The general theory of operation of such a signal generator is that, since the portions of the stream intercepted and passed by the body are determined by the position of its edge, variations in such position will produce substantially proportional variations in the pressure within the receiving aperture and motor chamber, and consequently the output impulse of the motor will vary substantially linearly with the position of the intercepting edge. As a matter of practice, detectors of the indicated kind have inherent characteristics that have limited the service of such signal generators. The present invention is directed to solution of problems presented by reason of certain of these characteristics and by such solutions greatly extending the field of utility of signal generators of this kind.

One limiting characteristic of nozzle and receiver detectors of conventional form, wherein the nozzle and receiver aperture are coaxially disposed, is that the range of positions of the intercepting edge wherein the receiver pressure varies in linear proportion to the change of such position is very restricted, extending very short distances to opposite sides of the diameter of the stream parallel to the intercepting edge. This characteristic has limited the field of service of such detectors to situations wherein the change of position of the intercepting edge can be restricted to such narrow ranges. In certain fields of operation, signal outputs of the motor are required to have greater ranges than can be accurately controlled by the narrow range of movement of the interceptor made necessary by the detector characteristic. In other fields the arrangements for moving the interceptor are such that movement of its edge cannot be restricted to the range of accurate control. In still other fields of service, wherein the interceptor body is moved by feedback mechanism controlled by the signal, so that the system tends to maintain the intercepting edge at a predetermined position, the feedback operation lags the initiating movement of the interceptor to such an extent that the edge of the interceptor can be kept in the narrow range of accurate control position only when movements of the interceptor body are relatively slow.

A second characteristic of nozzle and receiver detectors is that an elongated body, moving longitudinally and with its edge portion acting as the intercepting body, tends to disturb the stream. Such disturbance depends on the surface of air frictional characteristic of the body and also on the speed of the body. It has limited the speed at which such bodies can be moved when the lateral position of the body is detected by an assembly of the type in question.

In the last named kind of service, typified by a system for maintaining constant the lateral position of a longitudinally moving body, and including a signal generating system of the described kind that controls a servo system for correcting the position as it tends to vary, the limited range of accurate control, as well as the tendency of the body to disturb the stream, tends to limit the permissible speed of the body. This is because the rate of lateral change of position of the intercepting edge of the body is functionally related to the longitudinal speed of the body, so that at high speed the rate of change of position will be sufficiently high, relative to the rate of response of the servo system, to permit such edge to move outside the range of its accurate control positions.

One object of the invention is the provision of a novel arrangement of nozzle and receiver in a detector of the type in question, which provides a substantial increase over conventional detectors in the range of accurate control positions of the intercepting edge.

Another object is the provision of a novel arrangement of a signal generating system of the kind described, providing compensation of a disturbing effect on the detecting stream of a body having a marginal portion partially intercepting the system and moving longitudinally.

Another object is the provision of a novel arrangement of signal generating system of the kind in question, capable of producing a servo motor controlling signal for maintaining within small limits the lateral position of a body moving longitudinally at high speed.

In the accompanying drawings:

Fig. 1 is a schematic cross section of a nozzle and receiver forming a detector.

Fig. 2 is a similar cross section showing a practical structure arranged in accordance with the invention.

Fig. 3 is a similar view showing a slightly modified nozzle.

Fig. 4 is a rear elevation of an assembly such as that of Fig. 2.

Fig. 5 is a vertical section on line 5—5 of Fig. 2.

Fig. 6 is an enlarged fragmentary horizontal section on line 6—6 of Fig. 2.

Fig. 7 is a top plan of a detector assembly.

Figs. 8 and 9 are elevation and fragmentary plan schematics of a high speed web edge positioning system employing the invention.

Fig. 10 is a fragmentary plan, showing a different rotatable member for use in such a system.

Describing the drawings in detail and first referring to Fig. 1, a nozzle 10 is arranged to direct toward an aperture 11 of a receiver tube 12 a stream of fluid, such as air, under pressure. A body 13, the lateral position of which is to be detected and indicated by pressure developed in the receiver tube by the fluid stream, has an intercepting edge 14 the position of which is changeable transversely of the stream. The body 13 extends beyond the stream in one of the directions of change of position of the edge 14, so that a variable portion of the stream, determined by the position of the edge 14, is intercepted and prevented from reaching the receiver. Pressure within the receiver tube therefore is determined by the lateral position of the edge 14.

As indicated above, it has been accepted that in a device of this kind, the range of position of the intercepting edge 14, within which occur accurately representative variations in receiver pressure, is limited to very short distances extending on opposite sides of the diameter of the stream parallel to the intercepting edge.

The nozzle and receiver aperture arrangement now to be described, and forming an important part of the invention, is based on the discovery that the range of accurate pressure controlling positions of the intercepting edge is not symmetrical about the stream diameter parallel to the intercepting edge. Investigation has shown this lack of symmetry to be due to the stream-deflecting effect of the edge, which tends to direct the stream at an angular relation to the axes of the nozzle and receiver. This angular deflection of the stream is such as to direct it partially or wholly outside the area of the receiver aperture, so that the receiver pressure is not accurately determined by the part of the stream passed by the intercepting body. Under certain conditions, when the stream is so deflected as to miss the aperture, a negative pressure effect may be created in the receiver by aspiration of the stream.

Fig. 1 of the drawings diagrammatically illustrates the condition and an arrangement for correcting it. From this figure it will be seen that when the intercepting edge 14 lies within a certain range of positions, one of which is shown in full line, the stream will be directed, substantially parallel to the axes of the nozzle and receiver, and parallel to the line $a$. However, when the intercepting edge has advanced across the stream, say to the dotted line position, the stream will be deflected, for example parallel to lines $b$. According to prior practice, the aperture of the receiver has been the same size as the bore of the nozzle. From consideration of lines $b$ and line $c$, the latter of which is extended from the corresponding side of the nozzle bore, it will be seen that the indicated deflection is sufficient to direct the stream wholly to one side of a conventionally arranged receiver, the side of which would be arranged on line $c$.

Correction of this condition resides in relatively displacing the receiver and nozzle axes in the direction of stream deflection, so that the deflected stream will be wholly received by the receiver aperture. In this way, the asymmetrical characteristic of the accurately controlling range of intercepting edge positions is corrected, and the range is extended materially beyond that of conventional detectors. Such displacement of the receiver axis relative to the nozzle axis is lateral and in the direction that the edge 14 moves as interception of the stream by the body 13 is increased. In order to retain the useful extent of the range on the opposite side of the stream diameter parallel to the intercepting edge, that is to say on the side of the diameter from which the intercepting body extends into the stream, the receiver aperture is, as shown, larger than the nozzle bore. While not essential, it is regarded as preferable that the extreme portion 15 on the side in question of the receiver aperture 11 be in alignment with the corresponding extreme portion 16 of the nozzle bore 17.

Figs. 2 to 7 show practical and convenient structures of nozzle and receiver type detector assemblies based on the arrangement schematically shown by Fig. 1. In each of these figures the numeral 18 indicates a main plate that may be attached to a suitable base structure. A pair of upper and lower support plates 19 and 20 are secured to the main plate, preferably for adjusting movement to permit relative positioning of the receiver and nozzle that they respectively support. To this end the main plate may be as shown provided with a pair of horizontal slots 21 and a pair of vertical slots 22, through which extend bolts 23 and 24 that respectively enter threaded bores 25 in the rear edges of plates 19 and 20. By this arrangement the upper plate 19 may be adjusted vertically relative to the lower plate, while the latter may be adjusted horizontally relative to the upper plate. In and out positioning may be accomplished by suitable means, such as a hand wheel assembly 26, shown in Fig. 3.

When mounted on the supporting back plate 18, the plates 19, 20 define between their adjacent surfaces 27 a throat 28 for reception of an intercepting body, and across which a stream of fluid under pressure is directed from a nozzle to a receiver supported by the respective plates. Each plate is provided with a nozzle or receiver socket 29, including a cylindrical bore 30 opening through the plate surface 27, a shoulder 31, and a tapped plug-receiving portion 32. The receiver 33, here shown as mounted in the socket 29 of the upper plate 19, comprises a tubular nose portion 34 extending through the bore 30, a flange 35 seated on shoulder 31, and a tubular body 36 that extends through the tapped portion and beyond the surface of the plate. The nozzle 37 is quite similar, comprising portions 38, 39, 40 respectively corresponding to parts 34, 35 and 36 of the receiver. Receiver and nozzle are secured in the sockets 29 by plugs 41 having bores 42 through which extend body portions 36 and 40, and that hold flanges 35, 39 against the socket shoulders 31.

The offset arrangement of nozzle and receiver diagrammatically shown by Fig. 1 may be accomplished in various ways, two suitable nozzle arrangements being shown by Figs. 2 and 3. In Fig. 2 the delivery bore 43 of the nozzle is eccentric relative to the nose portion 38, the axis of the bore being spaced from that of the portion 38 in the direction from which the intercepting body 44 extends between the nozzle and receiver. Portions 34 and 38 of the nozzle and receiver are in coaxial disposition. In Fig. 3 the bore 45 of the nozzle is concentric with the nose portion 38, and the axis of the receiver is offset from the nozzle axis to the side opposite that from which the intercepting body extends. In the latter case, the nozzle assembly may be displaced from the receiver axis, as shown, or the plates 19 and 20 may be offset laterally to accomplish the noted offset of nozzle and receiver.

By means of the described offset relation between nozzle and receiver, the range of position of the edge of the intercepting body within which variation in pressure in the receiver aperture varies accurately with variations in such position is materially extended and this extension very substantially increases the utility of detector devices of this kind. Not only does it permit a wide range of edge positions to be used, but it also presents the very important attendant advantage of permitting change of position of the intercepting edge at speeds sufficiently high to move outside the previous limits of accurate control before a servo mechanism can act to check the movement by applying to the intercepting body an opposite correcting movement.

In Figs. 8 and 9, a detector assembly including a nozzle and receiver arrangement of the kind described above is designated 50. Air under pressure is supplied from a source 51 by a tube 52 the end of which is telescopically attached to the body portion of the nozzle, as more clearly shown in Fig. 2. The receiver is connected by a similar conduit 53 with the expansible chamber 54 of a signal generating motor 55. Chamber 54 is enclosed by a flexible diaphragm 56 and a casing 57. A connecting rod 58 serves as an output member, delivering the servo mechanism controlling signal generated by the detector and motor. In the system shown, a relay arrangement comprises a jet pipe regulator of known type, wherein a jet pipe 59, to which fluid is delivered under pressure, is pivoted to be swung to a position determined by the output impulse of the motor 54, to vary the relative pressures within a pair of distributor ports 60. The ports 60 communicate with a cylinder 61 respectively on opposite sides of a piston 62 which is double ended, that is to say provided with oppositely extending piston rods to equalize piston areas exposed to pressure in the respective ends of the cylinder. The piston serves to position the intercepting edge 63, and the system thereby comprises a complete feedback loop, operation of which is initiated by departure of the edge of the intercepting body from a predetermined position, varying the pressure within the receiver and motor chamber 54 and so operating the piston 62 to restore the body to its original position. A spring 64 opposes movement of the connecting rod 58, balanced opposing forces of the motor and spring serving to position the jet pipe in neutral position wherein equal pressures exist on opposite sides of piston 62 to hold the latter motionless.

The spring 64 serves as a means for selecting the position of the intercepting edge 63 relative to the pickup assembly of nozzle and receiver, since its force biases the jet pipe in one or the other direction, and a change in the force of the spring 64 requires a different pressure to be developed in the receiver and diaphragm chamber 54 to maintain the jet pipe in neutral position. The force exerted by spring 64 may be varied by a handwheel 65 that controls the compressive condition of the spring. This adjustment may be used to select a position of the intercepting edge 63 at a point in the detector for optimum operation of the regulator and for proper plus or minus sensitivity adjustment of the edge with respect to the nozzle and receiver. The desired position of the edge relative to external mechanisms may then be selected by in and out adjustment of the detector unit in one of the ways described above.

In the system disclosed in Figs. 8 and 9, the intercepting body is shown as a web 66 of flexible material and the edge position varying means as a rotatable body, here a spool or similar holder 67 on which the web is wound. The edges of the web are to be held very closely to predetermined lateral positions to produce a coil with even ends. An edge portion of the web passes through the throat of the detector and intercepts a portion of the air stream determined by the lateral position of the edge, so that its departure from a predetermined position sets piston 62 in motion. The spool 67, its supporting structure 68, and a drive motor 69 are mounted on a support 70, which is pivoted at a suitable point 71, preferably at the longitudinal and transverse centers of the holder 67, for swinging in a horizontal plane. The piston rod 72 of the piston 61 is linked to the supporting structure 68, so that swinging of the spool may serve as a means of correcting the position of the intercepting edge 63 of the web.

The same system may be used for maintaining alignment of a belt with a pulley, such a pulley and belt assembly being shown in Fig. 10. In this figure a belt 73 is trained over a pulley 74, having a crowned surface. The pivot point 71 is arranged under the center of this pulley, so that its crowned surfaces tend to swing along their own curves. A holder such as 67 of Fig. 9 may also be provided with a crowned surface if permitted by the nature of the material and type of coil being formed, and somewhat better edge registration will be accomplished than by a cylindrical holder.

The employment of the offset arrangement of nozzle and receiver described above, so extends the range of accurate control positions of the edge 63 as compared to the range afforded by conventionally arranged detectors, as to permit travel of the web at a speed producing such rapid change of position of the edge 63 as to be beyond the capacity of a servo system such as disclosed to maintain the edge in the range of accurate control of a conventional detector.

Another speed limiting factor for accurate detection of the position of the edge of a body moving past the detector at high speed which is compensated by this invention, is the frictional disturbance of the pressure in the receiver by the rapidly travelling surface. This disturbance of receiver pressure may be caused by disturbance of either the stream, the air pressure in the throat, or both. It is compensated in the system of Figs. 8 and 9, by the arrangement shown in Figs. 5 and 7. This arrangement comprises the addition to the detector of a compensating device in the form of a pressure pickup 75, generally similar to the receiver, and opening into the throat 28 at a point sufficiently remote from the nozzle to be wholly independent of the stream of air issuing from the latter. The axis of the pickup device may lie in the plane parallel to the direction of the travel of the intercepting body wherein lies the axis of the receiver, so that the body underlies a portion of the bore corresponding to the part of the stream intercepted before it reaches the receiver. The bore 76 of the compensating device is connected by a tube 77 with a second expansible chamber 78 of signal motor 55, enclosed between the second side of the diaphragm 56 and a casing part 79.

Compensation is accomplished by duplicating in the second motor chamber 78 that component of pressure in the first chamber 54 due to such disturbance. This renders the output of the detector motor 55 subject to only the influence of the nozzle stream; and permits adjustment of the system for operation at very high speeds.

Referring now to Figs. 4, 5 and 7, it will be seen that the provision for adjustable mounting of plates 19, 20 on main plate 18 relative to each other permits that they be made as duplicates and mounted in relatively inverted positions. For convenience in manufacture, each plate is provided with the sockets necessary to receive both a receiver and a compensating pickup. The socket that is opposed to the compensating device, designated 80 in Fig. 5, may be blocked by a plug 81, if desired.

From the foregoing description the advantages of the herein disclosed invention will be apparent, and it will be evident that changes in the details of structural arrangement may be resorted to within the scope of the invention as defined by the appended claims.

We claim:

1. In a device for generating a pressure variable with variations in lateral position of the edge of a body, and comprising a nozzle having a discharge bore for delivering a stream of fluid under pressure to be intercepted more or less by said body in accordance with the position of its said edge, and a receiver having an aperture for receiving the unintercepted part of such stream; the improvement comprising arrangement of the receiver with its axis spaced from the axis of the nozzle in the direction of movement of said edge as interception of the stream increases and with the aperture of the receiver extending laterally beyond the corresponding margin of the nozzle in said direction.

2. A device for detecting the lateral position of an edge of a movable body comprising, a nozzle having a bore for discharging a stream of fluid under pressure to be more or less intercepted by said body according to the position of its said edge, and a receiver having an aperture larger than the bore of the nozzle, partially opposed to said bore and having its axis displaced from that of the nozzle laterally and in the direction of movement of said body edge in increasing interception of the stream.

3. A device for detecting the lateral position of an edge of a movable body comprising, a pair of support plates having opposed surfaces defining a space for reception of said body and open at a side, a nozzle having a bore for directing a stream of fluid across said space, and a receiver having an aperture opposed to said nozzle for receiving such a stream, said aperture having its axis laterally displaced relative to that of the nozzle in the direction opposite to said open side.

4. A device for detecting the lateral position of an edge of a body movable to vary the lateral position of such edge comprising, a mounting plate, a pair of support plates secured in edge to face relation to said mounting plate and having opposed faces spaced to provide for entrance of said body between them, a nozzle extending through one support plate and having a bore for directing a stream of fluid toward said other plate, and a receiver comprising a tube extending through the other support plate and having an aperture for receiving said stream, said aperture being partially opposed to said nozzle bore and extending laterally beyond it toward said mounting plate.

5. A device in accordance with claim 4, wherein one support plate is adjustable on the mounting plate toward and away from the other support plate, and the other support plate is adjustable on the mounting plate in directions extending parallel to the first support plate.

6. A device in accordance with claim 4, wherein each of the nozzle and the receiver tube is mounted in a socket extending through one of the support plates.

7. A device in accordance with claim 4, wherein each of the nozzle and receiver tube is mounted in a socket extending through one of the support plates, said sockets are coaxial and opposed and wherein the nozzle bore and receiver aperture are so arranged in the nozzle and receiver tube respectively as to present said partial opposition and extension of the receiver aperture relative to the nozzle bore.

8. A device in accordance with claim 4, wherein each of the nozzle and the receiver tube is mounted in a socket extending through one of the support plates, said sockets, nozzle and receiver tube are coaxial, and wherein the nozzle bore is eccentric in the nozzle to present said partial opposition and extension of the receiver aperture relative to the nozzle bore.

9. A device in accordance with claim 4, wherein each of the receiver tube and nozzle is mounted in a socket extending through one of the support plates, the nozzle and nozzle bore are concentric with the socket in which the nozzle is mounted and the receiver and aperture are concentric with the socket in which the receiver tube is mounted, and wherein the axis of the socket in which the receiver tube is mounted is laterally offset in the direction of the mounting plate relative to the socket in which the nozzle is mounted.

10. A device in accordance with claim 4, wherein the support plates are identical and mounted in relatively inverted arrangement, each of the nozzle and the receiver tube is mounted in a socket extending through one of the support plates, the nozzle and nozzle bore are concentric with the socket in which the nozzle is mounted and the receiver tube and receiver aperture are concentric with the socket in which the receiver tube is mounted, and wherein the support plate through which the nozzle extends is mounted more outwardly of the mounting plate than the other support plate.

11. In a system for generating a signal variable in magnitude in accordance with lateral variations in the position of an edge of a longitudinally moving body, and including a nozzle for directing a stream of fluid to be intercepted to a greater or less extent by the body in accordance with the lateral position of its said edge, a receiver having an aperture for receiving said stream whereby the pressure in said aperture is varied by varying interception of the stream, and a pressure responsive signal generating motor connected with said receiver aperture; means for compensating disturbance of the pressure in the receiver aperture by longitudinal movement of the body comprising, a pressure pickup device having an aperture disposed to be adjacent a surface of the body, whereby pressure in the aperture varies as a function of the speed and the surface to air frictional characteristic of the body, and means for summarizing the pressures of said receiver and device apertures and operating the motor in accordance with their summation.

12. In a system for generating a signal variable in magnitude in accordance with lateral variations in the position of an edge of a longitudinally moving body, and including a nozzle for directing a stream of fluid to be intercepted to a greater or less extent by the body in accordance with the lateral position of its said edge, and a receiver having an aperture for receiving said stream whereby pressure in said aperture is varied by varying interception of the stream; means for compensating disturbance of the pressure in the receiver aperture by longitudinal movement of the body comprising a pressure pickup device having an aperture disposed to be adjacent a surface of the body, whereby pressure in the aperture varies as a function of the speed and the surface to air frictional characteristic of the body, means for opposing the respective pressures in the receiver and pressure pickup apertures, and motor means responsive to the resultant of said pressure for producing a signal.

13. A system for generating a signal varying in magnitude with the lateral position of an edge of a longitudinally moving body comprising a nozzle for directing a stream of fluid for greater or less interception of the body in accordance with the lateral position of said edge, a receiver having an aperture for receiving said stream whereby the pressure in said aperture is varied by varying interception of the stream, a speed compensating pressure pickup having an aperture disposed adjacent a surface of the body, whereby pressure in said aperture varies as a function of the speed and the surface to air frictional characteristic of the body, a motor having a pair of expansible chambers separated by a movable wall and respectively connected with the receiver and pressure pickup apertures, and a signal output member actuated by said movable wall.

14. A detector assembly for detecting the lateral position of the edge of a longitudinally moving body comprising, a pair of plates having spaced opposed surfaces defining a throat for passage of a marginal portion of the body, detecting means comprising a nozzle having a bore for directing a stream of fluid across said throat for greater or less interception of the body in accordance with the lateral position of its said edge and a receiver having an aperture for receiving the unintercepted portion of the stream, and a speed compensating pressure pickup having an aperture opening into the throat in spaced relation to the nozzle and receiver for detecting pressure variations in the throat due to speed and surface to air friction characteristics of the body.

15. A detector assembly according to claim 14 wherein the receiver aperture and nozzle bore are partially opposed and the former extends laterally beyond the corresponding margin of the latter in the direction in which the edge of the body advances in increasing interception of the stream.

16. A detector assembly according to claim 14 wherein the aperture of the pressure pickup is spaced from the nozzle and receiver in the direction opposite to that in which the body moves longitudinally.

17. A system in accordance with claim 13, wherein a pair of support plates having spaced opposed surfaces defining a throat for passage of the body respectively support the nozzle and receivers for directing the fluid stream across the throat to the receiver aperture, and wherein the aperture of the compensating device opens into said throat at a point spaced from the nozzle and receiver in a direction opposite to that in which the body moves longitudinally.

DANIEL T. GUNDERSEN.
LAWRENCE A. WEINECKE.

REFERENCES CITED

The following references are of record in the file of this patent:

UNITED STATES PATENTS

| Number | Name | Date |
| --- | --- | --- |
| 2,239,472 | Stanford | Apr. 22, 1941 |
| 2,380,357 | Ziebolz | July 10, 1945 |
| 2,388,457 | Ziegler | Nov. 6, 1945 |

FOREIGN PATENTS

| Number | Country | Date |
| --- | --- | --- |
| 673,159 | France | Oct. 7, 1929 |
| 486,885 | Great Britain | June 13, 1938 |